United States Patent [19]

Neuman

[11] 4,164,272
[45] Aug. 14, 1979

[54] CLEARANCE SENSING BRAKE ADJUSTER

[75] Inventor: Richard F. Neuman, Farmington, Mich.

[73] Assignee: Eaton Corporation, Cleveland, Ohio

[21] Appl. No.: 874,732

[22] Filed: Feb. 3, 1978

[51] Int. Cl.$^2$ .............................................. F16D 65/56
[52] U.S. Cl. ............................ 188/196 D; 188/79.5 K
[58] Field of Search ................ 188/79.5 K, 79.5 GE, 188/196 D, 196 BA

[56] References Cited

U.S. PATENT DOCUMENTS 4,088,206   5/1978   Garrett et al. ............. 188/79.5 K X Primary Examiner—Duane A. Reger
Attorney, Agent, or Firm—R. J. McCloskey; D. Wood; P. Rulon

[57] ABSTRACT

An automatic clearance adjuster for a cam actuated vehicle brake. The adjuster is disposed in a pivotal lever and includes a worm and worm gear, an adjusting mechanism for effecting a clearance decreasing rotation of the worm during the brake apply stroke, a torque limiting ratchet clutch which slips to prevent rotation of the worm by the adjusting mechanism when the shoes are in contact with the drum during the brake apply stroke, and a roller clutch which prevents clearance increasing rotation of the worm by the adjusting mechanism during the brake release stroke.

9 Claims, 5 Drawing Figures

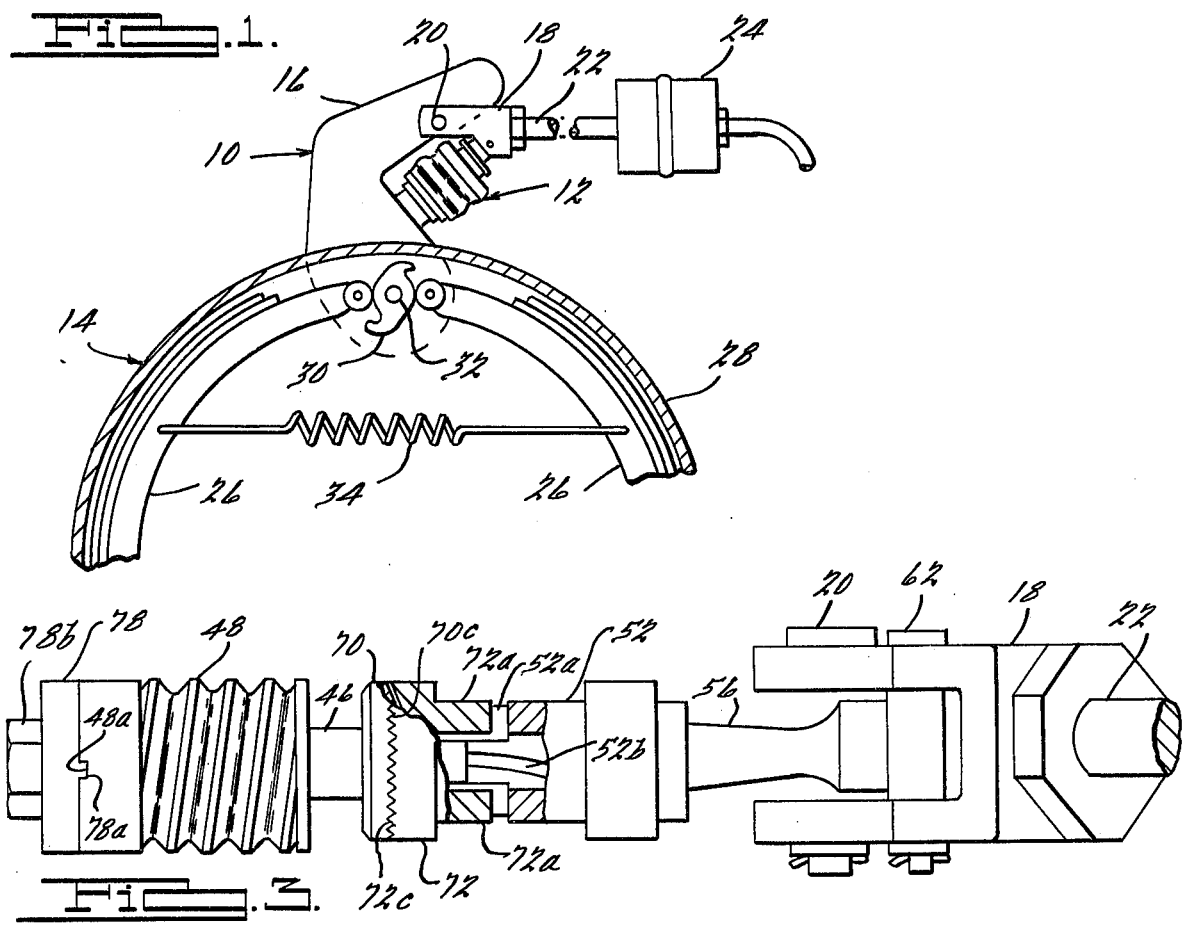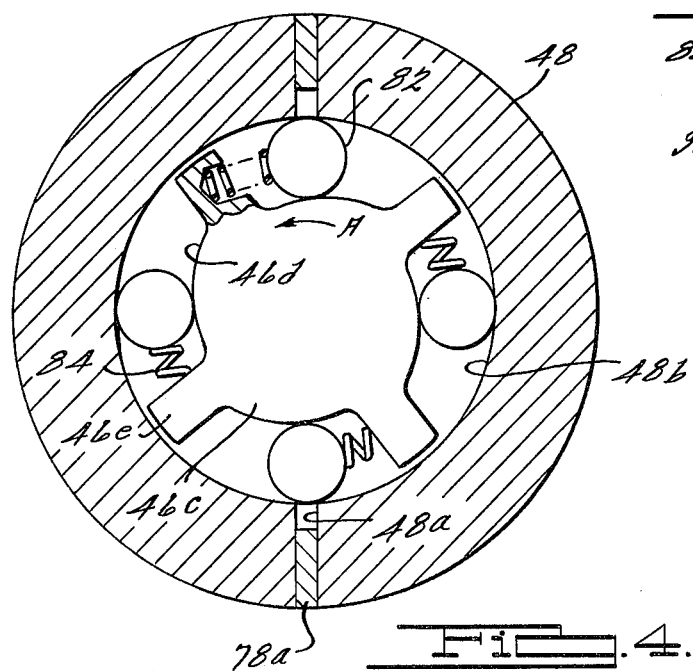

CLEARANCE SENSING BRAKE ADJUSTER

CROSS-REFERENCE

This application relates to pending U.S. applications Ser. No. 783,258 filed Mar. 31, 1977 and Ser. No. 783,259 filed Mar. 31, 1977, and both assigned to the assignee of this application.

BACKGROUND OF THE INVENTION

1. Field of the Invention

The invention relates to an automatic clearance adjuster for a brake and more specifically to such an adjuster having a torque limiting clutch for limiting clearance decreasing adjustment during the brake stroke in one direction and a roller clutch for preventing clearance increasing adjustment of the brake during the brake stroke in the other direction.

2. Description of the Prior Art

Automatic clearance adjusters employing means to prevent over adjustment of a vehicle brake due to elastic deformation of the brake assembly are well known. Such adjusters are said to be of the "clearance sensing type" which distinguish between the two parts of any brake apply or release stroke by sensing the relatively low braking forces required to move the brake shoes when the shoes are out of contact with the brake drum and the relatively high braking forces when the shoes are in contact with the drum. An adjusting mechanism in the adjuster automatically makes a clearance decreasing adjustment when the low force part of the brake stroke exceeds a predetermined length. The adjusting mechanism is blocked out or prevented from making a clearance decreasing adjustment during the high force part of the brake stroke to prevent over adjustment of the brake. The high force part of the brake stroke is often larger than the first part due to the high forces causing deformation in the brake assembly and therefore can quickly over adjust the brake if the adjusting mechanism is not blocked out.

One prior art brake adjuster, of the clearance sensing type, employs a disengaging clutch which physically disengages an adjusting mechanism in response to the high braking forces during both the brake apply and release strokes. This particular brake adjuster also includes an expanding type spring clutch which slips during the low force part of the brake apply stroke for preventing clearance adjustment and which resists slippage during the low force part of the brake release stroke for allowing clearance adjustment should the length of the low force part of the release stroke exceed a predetermined amount.

Another prior art brake adjuster of the clearance sensing type employs a torque limiting spring clutch having a high torque transmitting capacity in one driven direction and a low capacity in the other drive direction. The clutch slips in its high torque direction in response to the high braking forces during the brake apply stroke to prevent adjustment while the shoes are in contact with the drum. In this particular brake adjuster, clearance adjustment is made during the brake apply stroke should the low force part of the brake apply stroke exceed a predetermined amount. During the brake release stroke, the spring clutch slips in its low torque direction, first due to the high braking forces and then during the low force part of the stroke due to frictional forces on the adjusting mechanism caused by a Belleville spring.

While these adjusters provided a significant advance in the automatic adjust art, the clutches employed therein to control clearance adjustment require a rather high degree of quality control in manufacture and assembly.

SUMMARY OF THE INVENTION

An object of the invention is to provide an automatic clearance sensing adjuster which, by virtue of improved clutches for controlling clearance adjustment, is simple to manufacture and assemble, is low in cost, and is durable in use.

According to a feature of the invention, the adjuster includes a pivotal lever housing having first and second intermeshed gears disposed therein with the second gear operative to adjustably lock the first gear to the lever for applying and releasing a brake in response to pivotal reciprocation of the lever and for rotating the first gear relative to the lever and adjusting the brake clearance, a torque limiting clutch reciprocatingly rotatable relative to the lever in response to the pivotal reciprocation of the lever, and a one-way clutch interposed between the torque limiting clutch and the second gear and operative to drivingly connect the torque limiting clutch to the second gear in one drive direction of the torque limiting clutch and operative to drivingly disconnect the torque limiting clutch from the second gear in the other drive direction of the torque limiting clutch.

BRIEF DESCRIPTION OF THE DRAWINGS

The embodiment of the invention is shown in the accompanying drawings in which:

FIG. 1 illustrates a cam actuated brake and an actuator therefor with the invention adjuster disposed therein;

FIG. 3 illustrates further details of the adjuster in FIG. 2;

FIG. 4 is a section view taken along line 4—4 of FIG. 2; and

FIG. 5 is a partial view of a modified embodiment of a ratchet clutch in FIGS. 2 and 3.

DETAILED DESCRIPTION OF THE DRAWINGS

Figure 2:
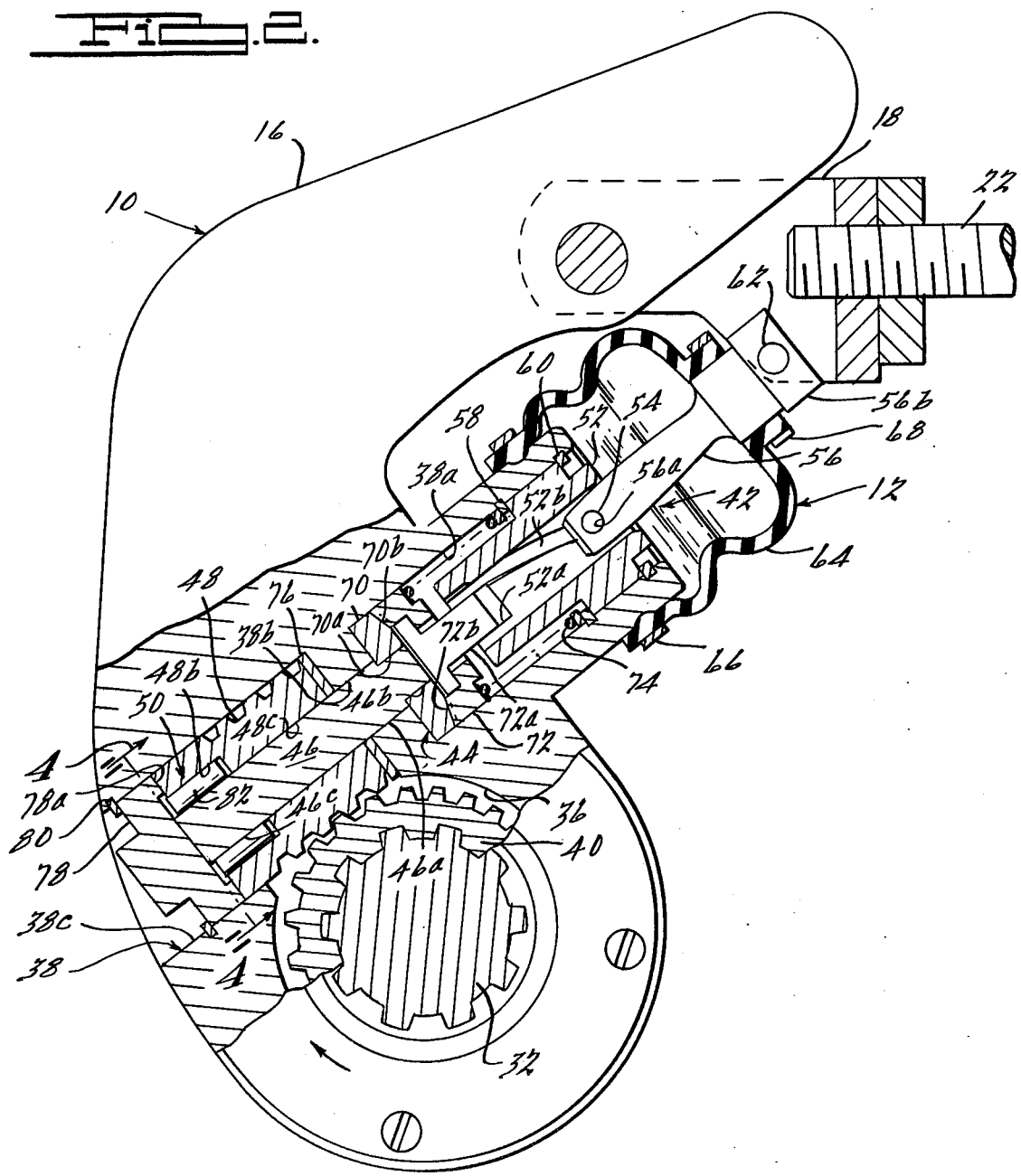
FIG. 2 is a partially broken away view of the actuator and adjuster of FIG. 1.

Referring now to FIG. 1, therein is shown a brake actuator 10 incorporating therein an automatic clearance adjuster 12 for a brake assembly 14 of a truck type vehicle. Actuator 10 includes an L-shaped lever 16 which is pivotally connected to a clevis 18 via a pin 20. Clevis 18 is in turn connected to a rod 22 which moves axially to the left to apply the brake in response to pressurized fluid acting on an unshown diaphragm in an air motor 24.

The brake assembly 14 includes a pair of friction members or brake shoes 26 which are moved radially outward into frictional contact with a rotating member or brake drum 28 in response to counterclockwise rotation of an S-cam 30 formed on or fixed to one end of a shaft 32. The other end of shaft 32 is splined to actuator 10 (see FIG. 2). Hence, pressurized fluid in motor 24 provides a force for moving rod 22 to the left and effecting a counterclockwise rotation of lever 16 and S-cam 30 about the axis of shaft 32 thereby moving lever 16 through its brake apply stroke. A spring 34 applies a force for retracting the brake shoes and an unshown spring in air motor 24 provides a force for retracting rod 22 when the pressurized fluid is removed, thereby moving lever 16 counterclockwise through its brake release stroke. Brake assembly 14 as thus far described is well known.

Looking now at FIGS. 2 and 3, lever 16 includes through bores 36 and 38 for housing portions of the clearance adjuster. Bore 36 rotatably supports a worm gear 40 which is splined to shaft 32. Bore 38 is defined by coaxial bore portions 38a, 38b, and 38c. Bore portion 38a houses a drive assembly 42 and a torque limiting ratchet clutch 44. Bore portion 38b provides rotational support for an end portion 46a of a worm shaft 46. The extreme end of shaft portion 46a defines a square drive portion 46b. Bore portion 38c houses a worm 48 and a roller clutch 50.

Drive assembly 42 includes a cylindrical sleeve member 52 having a slotted end 52a, a pair of internal helical grooves 52b which drivingly and loosely receive the ends of a pin 54 pressed through a hole 56a in a drive member 56. Sleeve 52 is rotatably supported by bore 38a and is retained therein against axial movement by snap rings 58 and 60. Drive member 56 includes a head portion 56b pivotally secured to clevis 18 by a pin 62 which also retains member 56 against rotation about its axis. The drive assembly is sealed against foreign matter by a rubber boot 64 which is secured to lever 16 and drive member 56 by clamps 66 and 68.

The loose fit between helical grooves 52b and the ends of pin 54 provide the adjuster with a lost motion for establishing the running or normal clearance of the brake; i.e., the clearance between the brake shoes and drum when the brake is fully released.

Pivotal movement of lever 16 about the axis of shaft 32 in a counterclockwise direction by air motor 24 to apply the brake immediately begins to move the brake shoes toward contact with the brake drum and axially moves drive member 56 further into sleeve 52 to effect a rotation of the sleeve in a clearance decreasing direction via the cooperation between pin 54 and helical grooves 52b. However, actual rotation of the sleeve about its axis does not begin until the lost motion is taken up.

Torque limiting ratchet clutch 44 includes an annular clutch member 70 rotatably seated against a shoulder defined by the difference in diameter between bore portion 38a and 38b, an annular clutch member 72, and a spring 74 for biasing the clutch members into interengagement with a substantially constant force. Clutch member 70 includes a square opening 70a which snugly receives square drive portion 46b of worm shaft 46 and a convex frusto-conical face 70b having a set of symmetric teeth 70c circumferentially arrayed thereon (see FIG. 3). Clutch member 72 includes a pair of tangs 72a which are received in slot 52a to drivingly interconnect the clutch member 72 and sleeve 52 and a concave frusto-conical face 72b having a set of symmetric teeth 72c circumferentially arrayed thereon and mating with teeth 70c (see FIG. 3). Each tooth 70c and 72c is inclined at about 25 degrees with respect to the direction of rotation of the clutch members for establishing the torque capacity or limit of the clutch in combination with the biasing force of spring 74. The biasing force of spring 74 is substantially constant and independent of the pivotal position of lever 14 and the axial position of drive member 56, whereby the torque capacity of the clutch is maintained relatively constant and within relatively close limits throughout the brake stroke.

Looking now at FIGS. 2, 3, and 4, worm 48 is rotatably supported by bore portion 38c and retained against axial movement in one direction by a shoulder defined by the difference in diameter between bore portions 38b and 38c. A thrust bearing 76 is interposed between the shoulder and the worm. Worm 48 is axially retained against axial movement in the other direction by a cap 78 and a snap ring 80. Cap 78 is fixed to rotate with worm 48 via a tongue portion 78a which is received in a groove portion 48a of the worm. Cap 78 also includes a hexagonal head portion 78b, whereby a wrench may be used to manually adjust the brake clearance.

Roller clutch 50, which is integrally formed with shaft 46 and worm 48, includes an outer race 48b defined by a counterbored portion of a through bore 48c in the worm, an inner race 46c defined by one end of shaft 46 which rotatably extends through bore 48c, and four roller bearings 82. Inner race 46c (see FIG. 4) includes four cam surfaces 46d separated by four radially extending rib portions 46e which carry four springs 84 for biasing the rollers up the ramps of the cam surfaces.

OPERATION

As previously mentioned, any brake apply and release stroke consists of a low force part for moving the brake shoes through the running clearance between the shoes and brake drum and a high force part for moving the shoes while they are in contact with the drum. During the low force part of the brake apply stroke, lever 16 rotates counterclockwise about the axis of shaft 32 and carries therewith worm 48 and worm gear 40, thereby rotating shaft 32 for moving the brake shoes through the running clearance and into contact with the drum. Once the shoes firmly contact the drum, the force required to rotate lever 16 rises sharply and as a result the meshing force between the worm and worm gear teeth rises sharply. Also during the low force part of the brake apply stroke, drive member 56 moves axially into sleeve 52. This axial movement of the drive member takes up the lost motion created by the loose fit between pin 54 and helical grooves 52b before effecting a rotation of sleeve 52 and clutch member 72. If the brake is properly adjusted, take up of the lost motion and firm contact of the shoes with the drum will be coincident with the end of the low force part of the apply stroke. Further, counterclockwise rotation of lever 16, i.e., the high force part of the apply stroke, effects rotation of clutch member 72 and enough rotation of clutch member 70, shaft 46, and inner race 46c in the direction of arrow A (see FIG. 4) to lock up roller clutch 50 and effect a driving connection of shaft 46 to worm 48. However, this driving connection will not allow ratchet clutch 44 to rotate worm 48 since the torque required to do so is greater than the torque capacity of the ratchet clutch due to the meshing force between the worm and worm gear teeth once the shoes are in firm contact with the drum. Hence, the teeth of clutch member 72 will ratchet over the teeth of clutch member 70, thereby preventing a clearance decreasing adjustment of the brake.

If the brake is under adjusted (i.e., the running clearance exceeds a predetermined amount established by the lost motion), the length of the low force part of the apply stroke will exceed the stroke length required to take up the lost motion, i.e., the driving connection through roller clutch 50 will be effected before the shoes contact the drum, whereby ratchet clutch will rotate worm 48 to effect rotation of worm gear 40 relative to lever 16 and effect a clearance decreasing adjustment of the brake.

During the brake release stroke, drive member 56 retracts, takes up the lost motion in the reverse direction, and then rotates ratchet clutch 44, worm shaft 46 and inner race 46c in a direction opposite that of Arrow A. This opposite rotation completely disconnects roller clutch 50 and prevents a clearance increasing adjustment of the brake by the adjuster.

Ratchet clutch 44 has been disclosed as having teeth 70c and 72c inclined on both of their drive face sides, whereby the clutch is a two-way torque limiting clutch. FIG. 5 discloses a partial view of an alternative ratchet clutch 86 having clutch members 88 and 90 formed with asymmetric teeth 88a and 90a with each tooth having an inclined drive face in the direction of clutch rotation for decreasing brake clearance and a straight side normal to clutch rotation in the direction of clutch rotation that would increase brake clearance.

The preferred embodiment of the invention has been disclosed in combination with an S-cam brake environment for illustration purposes. However, the invention may be used in other environments. Further, many variations and modifications of the preferred embodiment are believed to be within the spirit of the invention disclosed. For example, the adjuster can easily be made to adjust on the brake release stroke rather than the apply stroke and/or the torque limiting ratchet clutch could be replaced by a spring clutch such as disclosed in U.S. Pat. No. 3,507,369. The following claims are intended to cover the inventive portions of the preferred embodiment and modifications and variations believed to be within the spirit of the invention.

What is claimed is:

1. A brake clearance adjuster including a lever housing having first and second intermeshed gears disposed therein, said second gear operative to rotate said first gear with said housing for applying and releasing said brake in response to pivotal reciprocating movement of said housing, and said second gear rotatable relative to said housing for rotating said first gear relative to said housing and adjusting the brake clearance, wherein the improvement comprises:
   a torque limiting clutch reciprocatingly rotatable relative to said housing in response to said pivotal reciprocation of said housing for effecting rotation of said second gear relative to said housing; and
   a one-way clutch interposed between said torque limiting clutch and said second gear, said one-way clutch operative to drivingly connect said torque limiting clutch to said second gear in response to rotation of said torque limiting clutch in one direction and operative to drivingly disconnect said torque limiting clutch from said second gear in response to rotation of said torque limiting clutch in said other direction.

2. The adjuster of claim 1, wherein said one-way clutch is a roller clutch.

3. The adjuster of claim 1, wherein said torque limiting clutch is a ratchet clutch; and said one-way clutch is a roller clutch.

4. The adjuster of claim 1, wherein said one-way clutch drivingly connects said torque limiting clutch to said second gear during the brake apply stroke.

5. In an automatic adjuster for controlling clearance between first and second relatively rotatable friction members which are engaged to diminish such relative rotation, said adjuster including a lever housing having first and second intermeshed gears disposed therein; said first gear adapted for driving connection with one of said friction members; said second gear operative to rotate said first gear with said lever for engaging and disengaging said one friction member in response to pivotal reciprocating movement of said lever; said second gear rotatable relative to said housing for rotating said first gear relative to said housing and adjusting said brake clearance; wherein the improvement comprises:
   drive means reciprocatingly rotatable about the axis of said second gear in response to said pivotal reciprocation of said lever;
   a torque limiting clutch having first and second clutch members rotatable about the axis of said second gear, said first clutch member rotated by and in positive driving relation with said drive means; and
   a one-way clutch interposed between said second clutch member and said second gear and rotatable about the axis of said second gear, said one-way clutch operative to drivingly connect said second clutch member to said second gear in response to rotation of said second clutch member in one direction and operative to drivingly disconnect said second clutch member in response to rotation of said second clutch member in the other direction.

6. The adjuster of claim 5, wherein said one-way clutch is a roller clutch.

7. The adjuster of claim 5, wherein said torque limiting clutch is a ratchet clutch; and said one-way clutch is a roller clutch.

8. The adjuster of claim 5, wherein said one-way clutch drivingly connects said torque limiting clutch to said second gear during the brake apply stroke.

9. An automatic clearance adjuster for controlling clearance within predetermined limits between first and second relatively rotatable friction members which are engaged and disengaged respectively to diminish and allow such relative rotation in response to pivotal reciprocation of a lever defining a housing, said adjuster comprising:
   a first gear rotatably disposed in said housing and adapted to move one of said friction members into said engagement and disengagement in response to said pivotal reciprocation and adapted to adjust said clearance when rotated relative to said lever;
   a second gear rotatably disposed in said housing and in mesh with said first gear, said second gear operative to adjustably lock said first gear to said lever for effecting said engagement and disengagement, and said second gear rotatable relative to said lever for effecting rotation of said first gear relative to said lever and for adjusting said clearance;
   drive means for rotating said second gear relative to said lever in response to said pivotal reciprocation;
   a torque limiting clutch operative in at least one direction of rotation to prevent rotation of said second gear when the torque limit required to rotate said second gear relative to said housing exceeds the torque limit of said clutch;
   a one-way roller clutch drivingly interposed between said torque limiting clutch and said second gear, said one-way clutch operative to drivingly connect said drive means to said second gear in response to rotation of said drive means in one direction and operative to rotate said first gear relative to said lever when the torque required to rotate said second gear is below the torque limit of said torque limiting clutch, and said one-way clutch operative to drivingly disconnect said drive means from said second gear in response to rotation of said drive means in said other direction, whereby rotation of said first gear relative to said lever by said torque limiting clutch is prevented.

* * * * *